United States Patent [19]

Keller

[11] 4,269,329
[45] May 26, 1981

[54] PLANT-WATERING DEVICE

[76] Inventor: Terry M. Keller, 85 Estabrook #115, San Leandro, Calif. 94577

[21] Appl. No.: 94,578

[22] Filed: Nov. 15, 1979

Related U.S. Application Data

[63] Continuation-in-part of Ser. No. 907,581, May 19, 1978, abandoned.

[51] Int. Cl.³ .............................................. B67D 5/44
[52] U.S. Cl. ..................................... 222/333; 222/470
[58] Field of Search ............... 222/333, 470, 464, 211, 222/76

[56] References Cited

U.S. PATENT DOCUMENTS 4,154,375  5/1979  Bippus ............................ 222/333 X

FOREIGN PATENT DOCUMENTS 244301  12/1925  United Kingdom ..................... 222/470

*Primary Examiner*—Stanley H. Tollberg
*Attorney, Agent, or Firm*—Manfred M. Warren; Robert B. Chickering; Glen R. Grunewald

[57] ABSTRACT

A plant watering device designed for watering overhead normally out-of-reach plants is disclosed comprising a housing with a handle for manual portability and support in the normally upright position of use and having a liquid fill opening for the reservoir. A rigid self-supporting conduit carried by the housing extends upwardly therefrom and has a distal, normally upper discharge end which extends the vertical reach of the user. A motor compartment is positioned at the bottom of the housing and has within it an electric motor and a pump driven thereby with a battery mounted in the compartment. The pump has an inlet connected to the reservoir and an outlet connected to the conduit. A manually actuatable electric switch is mounted on the housing in position for conjoint manual engagement of the handle and actuation of the switch. The switch is electrically connected to the battery and the motor.

3 Claims, 2 Drawing Figures

PLANT-WATERING DEVICE

This application is a continuation-in-part of my Application Ser. No. 907,581, filed May 19, 1978, (now abandoned) for WATERING THING.

BACKGROUND OF THE INVENTION

1. Field of Invention

The invention relates generally to watering devices for plants and, more particularly, to hand-held portable watering devices having electrically-driven pump means for dispensing water.

2. Description of Prior Art

There are a number of problems associated with the watering of house plants. House-plant watering is normally accomplished through the use of a pitcher or similar liquid-carrying vessel which is tilted by the user to deliver its contents to the plant. The aforementioned manual watering scheme is not well suited for delivering water to hanging plants or to plants which are situated in an out-of-reach location. The use of a manually-held pitcher has serious disadvantages even in the case of conveniently situated plants which have foliage extending beyond the perimeter of the plant container. In this case, in order to deliver water to the plant container, the user must either penetrate the foliage with the pitcher or position the pitcher directly above the plant container and pour through the foliage. When the user penetrates the foliage with the pitcher, there is a risk of breaking or damaging the plant structure. When water is poured from above, the foliage may deflect the water stream, thus preventing efficient delivery to the plant container and possibly causing damage to surrounding carpets and furniture.

An additional disadvantage attendant to the use of ordinary water containers for plant watering is that the user's ability to control the outflow of water from the vessel decreases as the vessel's contents are used up. When a water container is full, the user need only tilt the container a slight amount in order to deliver water. As the contents of the vessel are used up, the angle of tilt must be dramatically increased in order to deliver the vessel's contents. When a vessel is nearly empty, the user is forced to turn the vessel almost completely upside down in order to deliver its contents. In such exaggerated attitudes, control of the outflow becomes extremely difficult.

The aforementioned drawbacks associated with the use of ordinary water containers for plant watering have given rise to rather intense inventive efforts. In order to provide a watering device which need not be tilted in order to accomplish its intended function, inventors have turned toward the use of electrically-driven pumping means to deliver water from the container. Various schemes have been proposed, most of which employ a motor-driven pump which is positioned above the water container. The positioning of the pumping machinery and batteries above the water container is a compromise solution. It is more desirable, from the standpoint of efficiency, to position the pump beneath the level of the water. Submerging the pump, motor and batteries presents problems which cannot be solved in an economically feasible manner. One problem in particular with such a structure is that the electric motor must be waterproof, including the provision of a waterproof rotary seal on the motor shaft. The expense of this structure precludes its use in reasonably priced home watering devices. Placing the motor, pump and power source above the level of the water solves, or at least lessens, the waterproofing problems. The top-mounted pump arrangement is not only hydraulically inefficient, but takes some time to prime and also causes the watering device to be rather top-heavy.

Other prior art devices use a motor-driven pump to pressurize the air inside the liquid container, thus forcing the liquid out of a dispensing hole. This structure requires the use of an airtight vessel and airtight seals within the pumping unit. The expense of this structure precludes its use in inexpensive home devices. A further disadvantage of the pressurized system is that, unless the seals are perfect, the vessel will depressurize during the long periods of nonuse, thus requiring repressurization during the next use. This often results in an annoying delay during which time the pump is repressurizing the container. The delivery of water is delayed by a period of time dependent upon the vessel's size, pump size, etc.

The watering devices in the prior art are all distinguishable from the instant invention in that none discloses or suggests the structure of the present invention, which provides all of the advantages of a submerged pump without requiring the use of a waterproofed electrical motor or complicated seals.

SUMMARY OF THE INVENTION

An object of the present invention is to provide an electrically operated automatic plant-watering device having the following features:

(a) an appearance very similar to that of an ordinary watering pitcher;

(b) capable of delivering water to out-of-reach plants by means of a self-supporting discharge conduit extending upwardly from the device; and (c) has an electrically-driven pump which is located below the level of the water to provide maximum efficiency and stable weight distribution.

The present invention is a plant-watering device which will allow the user to conveniently water all house plants without the use of stools, chairs, ladders or the like. The plant-watering device of the instant invention allows the delivery of water to plants with thick foliage without requiring the user to penetrate the foliage with a large structure. The present invention is simply constructed out of readily available parts and does not require the use of special seals. A pitcher-like housing provides a water reservoir and has a handle upon which an electric switch is mounted. A rigid self-supporting conduit extends upwardly from the housing and has a distal, normally upper discharge which greatly extends the vertical reach of the user. A motor compartment is positioned at the bottom of the housing and encloses an electric motor and pump along with a battery. The pump has an inlet connected to the reservoir and an outlet connected to the conduit. The switch is wired to the battery and motor so that, when it is actuated, water is delivered from the discharge end of the conduit.

The present invention provides a self-priming, highly efficient automatic watering device which is easily constructed and requires virtually no maintenance other than periodic battery replacement. The device is very stable and well balanced due to the positioning of the pump, motor and batteries beneath the reservoir.

The present invention, by providing all of the advantages of a submerged pump and motor without requiring the use of a waterproof motor, elegantly solves a problem which has previously eluded solution in the prior art. The device of the present invention can successfully employ inexpensive electric motors which do not have waterproof rotary seals on their shafts.

The invention possesses other objects and features of advantage, some of which of the foregoing will be set forth in the following description of the preferred form of the invention which is in the drawing accompanying and forming part of the specification. It is to be understood, however, that variations in the showing made by the said drawing and description may be adopted within the scope of the invention as set forth in the claims.

DETAILED DESCRIPTION OF THE INVENTION

Figures 1, 2:
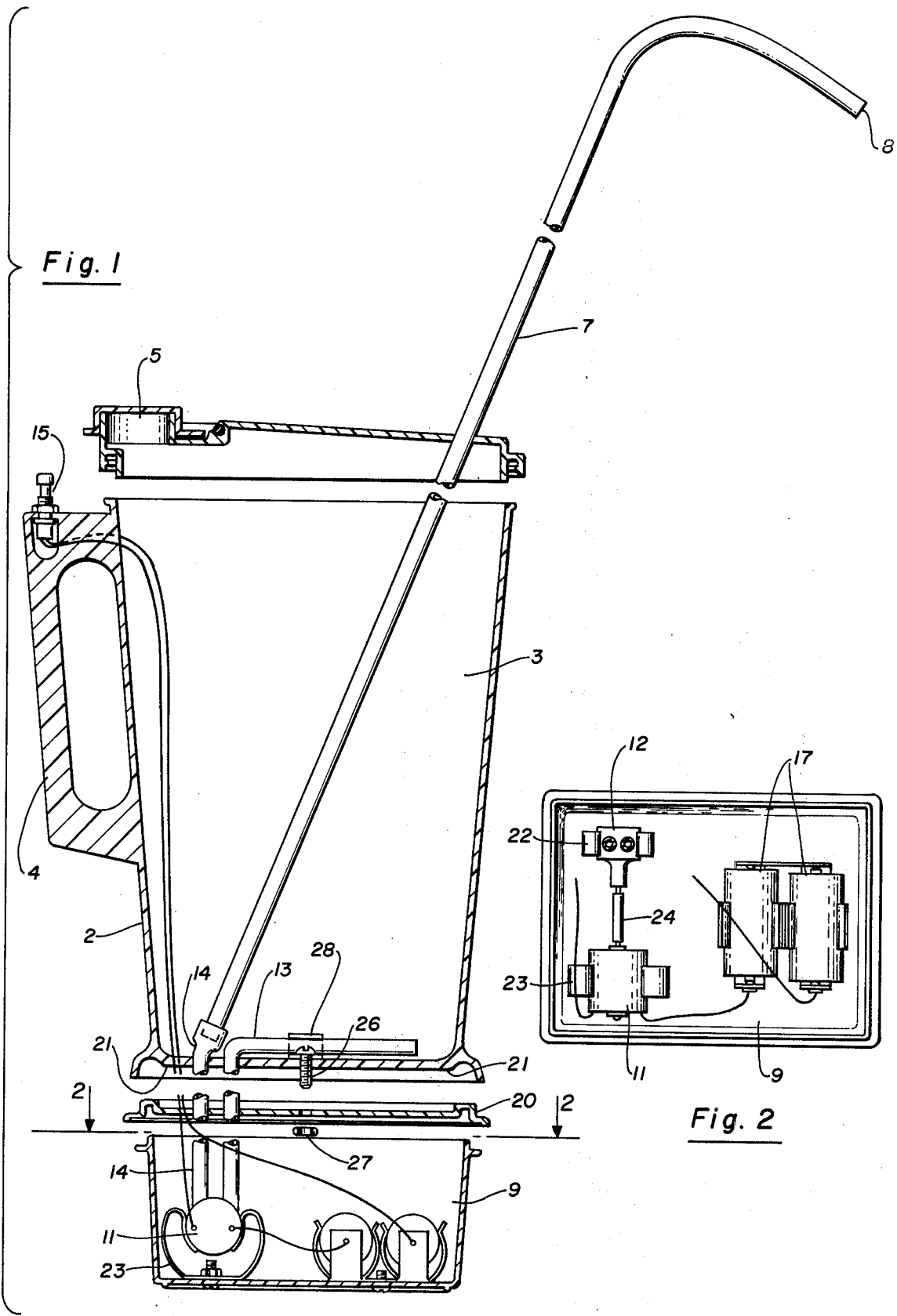
FIG. 1 is an exploded cross-sectional side view of the instant invention.
FIG. 2 is a cross-sectional top view taken substantially on the plane of line 2—2 of FIG. 1.

The watering device of the present invention comprises, briefly, a housing 2 providing a water reservoir 3 and having a handle 4 for manual portability and support in a normally upright position of use. A liquid fill opening 5 is provided on the top of housing 2 to allow filling of the reservoir. A rigid, self-supporting conduit 7 is carried by the housing and extends upwardly therefrom. The conduit 7 has a distal, normally upper discharge end 8 which extends the vertical reach of the user.

A motor compartment 9 is positioned at the bottom of housing 2 and has, mounted within it, an electric motor 11 which is connected to and drives a pump 12. Pump 12 has an inlet 13 connected to the reservoir 3 and an outlet 14 connected to the conduit 7. A manually actuatable electric switch 15 is mounted on the housing in a position for conjoint manual engagement of the handle 4 and actuation of the switch 15. Switch 15 is electrically connected to batteries 17 and to the motor 11.

In the preferred form, the motor compartment 9 has a normally top wall 20 secured to the bottom wall 21 of housing 2. Top wall 20 shields the motor compartment 9 from water which may escape through bottom wall 21. In the preferred form, the motor compartment 9 has a side wall which is demountably secured to the top wall 20, as shown in the exploded view of FIG. 1.

As seen in FIG. 1, the pump connections to the reservoir 3 and the conduit 7 are tubes which are connected to the pump inlet 13 and outlet 14 and extend through and are sealed in the top and bottom walls 20 and 21. As seen in FIG. 2 and in the bottom of FIG. 1, the pump 12 and motor 11 are demountably secured by spring clips 22 and 23 respectively. In the preferred form, the shafts of the pump 12 and motor 11 are connected by means of a flexible, tight fitting coupling tube 24 which acts as a universal joint and intermediate shaft. The wires leading from motor compartment 9 to switch 15 pass, in the preferred form, through the water reservoir 3. This provides for a clean looking exterior and does not cause any serious sealing problems. Similarly, inlet tube 13 and outlet tube 14 pass from the motor compartment 9 into water reservoir 3. It has been found that the wires and tubes can be easily sealed since they do not move or rotate during operation. The only rotary seal necessary is the seal on the shaft of pump 12. Pumps are normally supplied with packing glands or other sealing means on the shaft, so this presents no special problem.

Actuation of switch 15 completes the circuit between batteries 17 and motor 11, causing the transmission of rotational force through coupling tube 24 to pump 12. Pump 12 draws water from reservoir 3 through inlet 13 and discharges the water through outlet 14 into conduit 7. The water eventually exits the conduit at the discharge end 8 which is positioned over the plant which is to be watered.

In FIG. 1, screw 26 and nut 27 are used to fasten the top wall 20 of the motor housing 9 to the bottom wall 21 of housing 2. Retainer 28 is used to fix the relative position of inlet 13 so that the pump will be able to fully drain the contents of reservoir 3. The spring clips 22 and 23 allow for very rapid installation and removal of the pump 12 and motor 11. The spring clips are fastened to the motor compartment by means of threaded fasteners.

As seen in FIG. 1, conduit 7 is bent near its discharge end so that it extends not only the vertical, but also the horizontal reach of the user. The length of conduit 7 is limited mainly by the power of the pump-motor combination. It has been found that a length of 18" to 24" between the discharge end 8 and the top of the housing 2 is suitable for most household uses. In the preferred embodiment, two dry cells are used to power a small permanent-magnet type electric motor which drives a positive displacement pump. The flow rates provided by this arrangement have been found quite suitable for the watering of household plants. In the preferred embodiment, housing 2 is an ordinary plastic water pitcher and motor compartment 9 is a plastic food container. In FIG. 1, it will be noted that, should water leak through the bottom wall 21, it will not flow directly into motor compartment 9. Top wall 20 will deflect any leaking water and provide an extra measure of protection against flooding of the motor compartment 9. In the preferred embodiment, wall 20 has a lip around its outer periphery which will function, in the event of a leak through wall 21, to divert water over the edge of the lip, thus causing it to run harmlessly down the outside of motor compartment 9.

What is claimed is:

1. A plant watering device designed for watering overhead normally out-of-reach plants comprising:

a housing providing a water reservoir and having a handle for manual portability and support in a normally upright position of use and having a liquid fill opening for said reservoir, said housing having a bottom wall;

a rigid self-supporting conduit carried by said housing and extending upwardly therefrom and having a distal, normally upper discharge end extending the vertical reach of the user;

a motor compartment positioned at the bottom of said housing, said compartment having a normally top wall secured to the bottom wall of said housing and shielding said compartment from water escaping through said bottom wall, said compartment having a side wall demountably secured to said top wall;

an electric motor and pump connected thereto and driven thereby and a battery mounted in said compartment, said pump having an inlet connected to said reservoir and an outlet connected to said conduit; and a manually actuatable electric switch mounted on said housing in position for conjoint manual engagement of said handle and actuation of said switch and being electrically connected to said battery and said motor.

2. The device of claim 1, the pump connections to said reservoir and said conduit comprising tubes connected to said pump inlet and outlet and extending through and sealed in said top and bottom walls.

3. The device of claim 1 and spring clips mounted in said motor compartment and demountably securing said motor and pump.

* * * * *